United States Patent [19]

Toda et al.

[11] Patent Number: 4,572,951

[45] Date of Patent: Feb. 25, 1986

[54] SYSTEM FOR DETECTING AN ABSOLUTE POSITION

[75] Inventors: Jitsuo Toda, Koganei; Wataru Shimizu, Fuchu, both of Japan

[73] Assignee: Kabushiki Kaisha SG, Tokyo, Japan

[21] Appl. No.: 450,634

[22] Filed: Dec. 17, 1982

[30] Foreign Application Priority Data

Dec. 21, 1981 [JP] Japan .............................. 56-205138

[51] Int. Cl.⁴ .............................................. G01D 5/34
[52] U.S. Cl. ........................... 250/231 SE; 340/347 P
[58] Field of Search .................. 356/395; 250/237 G, 250/231 SE; 340/347 P

[56] References Cited

U.S. PATENT DOCUMENTS

| | | | |
|---|---|---|---|
| 3,419,727 | 12/1968 | Pabst | 250/231 SE |
| 4,041,483 | 8/1977 | Groff | 250/231 SE |
| 4,183,014 | 1/1980 | McClean et al. | 250/231 SE |
| 4,384,275 | 5/1983 | Masel et al. | 340/347 P |

*Primary Examiner*—David C. Nelms
*Assistant Examiner*—J. Gatto
*Attorney, Agent, or Firm*—Spensley, Horn, Jubas & Lubitz

[57] ABSTRACT

A plurality of detectors, i.e., encoders, are prepared each of which generates an output signal representing an absolute value below one period at a predetermined period with respect to a given rotational or linear displacement. A displacement associated with a rotational or linear displacement of an object of detection is provided to each detector and one period of each detector is established in such a manner that one such period corresponds to one of mutually different predetermined amounts of displacement of the object. As a result, the output signal of each detector changes at a rate which is different from one another with respect to the displacement of the object and a combination of values of the output signals of the respective detectors is sufficient to identify an absolute position of the object. Accordingly, the number of periods from an origin with respect to a predetermined detector is determined employing the present output signals of the respective detectors as a parameter and the absolute position is specified by a combination of an integer section of this number of periods and a value below one period represented by the output signal of this predetermined detector.

29 Claims, 14 Drawing Figures

SYSTEM FOR DETECTING AN ABSOLUTE POSITION

BACKGROUND OF THE INVENTION

This invention relates to a system for detecting, in an absolute value, a rotational position (angle) of a rotary shaft of a motor or other rotary members or a linear position of a work table, piston rod or other linearly displacing members.

A prior art rotary encoder can detect only an absolute position within a single rotation. For detecting an absolute position over a number of rotations, a separate rotation number detection means is provided and the rotation number detected by this detection means is combined with the absolute number within the single rotation. The prior art rotation detection means requires gears of a fairly large reduction ratio for detecting the rotation number in an absolute value. For instance, in a case where a reduction gear mechanism is constructed so as to be capable of detecting 32 rotations of a main shaft, it is conceivable that 32 teeth are provided on the main shaft and 1024 teeth are provided on a reduction output shaft. In this case, an expected accuracy of response at a change point of the rotation number is only an accuracy of one thirty-seconds of one rotation, i.e., about 11° in terms of angle. As will be seen from this example, no high accuracy of detection can be expected notwithstanding that a gear mechanism of a high precision is required. For avoiding such disadvantage, it has also been practiced to obtain the rotation number by counting an incremental pulse. This method, however, is disadvantageous in that the rotation number becomes undetectable for stoppage of an electrical current or other accidental reasons.

It is, therefore, an object of the present invention to provide a system capable of detecting an absolute position over a wide range. It is another object of the invention to perform such absolute position detection with a high precision and without requiring a bulky reduction gear mechanism.

SUMMARY OF THE INVENTION

For achieving the above described objects, a plurality of detectors (i.e., encoders) are provided in the system according to this invention, each of which generates, at a predetermined period, an output signal representing an absolute value below one period with respect to a given mechanical displacement. Each detector is provided with a displacement associated with the displacement of the object of detection in such a manner that one period of each of the detectors, output signal corresponds to mutually different one of predetermined amounts of displacement of the object, which amounts of displacement differ from one another. As a result, values of the output signals of the respective detectors in response to the displacement or position of the object differ from one another with a predetermined relationship. The combination of the mutually different output signals of the respective detectors can be expressed as a function relating the number of periods of the respective detector output signal to the amount of displacement of the object from a predetermined origin to the present position. Accordingly, it is possible to determine the number of periods from the origin to the present position of the object with respect to a predetermined one of the detectors (a first detector), employing, as a parameter, the output signals of the respective detectors representing values below one period in correspondence to the present position of the object. By combining an integer value of the number of periods thus determined with a value below one period represented by the output signal of the first detector, the present position of the object can be identified in an absolute value.

The amount of displacement of the object corresponding to one period of the first detector is predetermined and the values of the output signals of the other detectors corresponding to the amount of displacement also is predetermined. That is, the amount of displacement of the object corresponding to one period of the respective detectors is fixed at mutually different predetermined values. If, accordingly, a mechanical displacement of the object which produces change for one period in the output signal of the first detector is taken as a unit, differences between the output signal of the first detector and the output signals of the other detectors both corresponding to this mechanical displacement of one unit are given as known values. The number of periods of the first detector corresponding to the present position of the object can be obtained by individually dividing differences between the present output signal of the first detector and the present output signals of the other detectors by these known differences in the period. Thus, the number of periods of the first detector for any displacement of the object (can be determined by the operation employing the output signal of the respective detectors as a parameter. This operation can be made not only by the above described division employing the differences between the period but by a suitable formula in accordance with mathematical analysis. The operation can be carried out not only by calculation circuit but by a table consisting of a ROM, RAM or the like device.

As the detectors, detectors of a rotational position detection type or a linear position detection type or a combination thereof may be used. If the detectors are of a type that generate the output signals at the same rate with respect to the mechanical displacement provided thereto, suitable transmission means (e.g. gear transmission) is employed for providing the detectors with the displacement of the object at mutually different rates. Conversely, if the detectors are of a type that generate the output signals at different predetermined rates with respect to the mechanical displacement provided thereto, the displacement of the object may be transmitted to the respective detectors at a common rate. What is essential is that one period of the output signal of each detector should correspond to a different amount of displacement with respect to the displacement of the object.

Since the number of periods relating to the first detector is determined by using the output signals of the respective detectors, resolution in the determination of the number of periods is substantially the same as resolution in the detection of the absolute value below one period of the detector and therefore is of a high accuracy. If, for example, the first detector is an absolute rotary encoder connected to a main rotary shaft, which is the object of detection, and this first detector detects an absolute angle of one rotation at an accuracy of N division, the number of periods of the first detector, i.e., the number of rotation of the main shaft, can be detected at the accuracy of N division per single rotation. Alternatively stated, the accuracy of detection at a change point in the rotation number (the number of periods) is one N-th of one rotation (one period), which is entirely the same as the accuracy of the absolute rotary encoder itself. Accordingly, absolute positions over a wide range can be detected at high accuracy.

DETAILED DESCRIPTION OF THE PREFERRED EMBODIMENT

Figure 1:
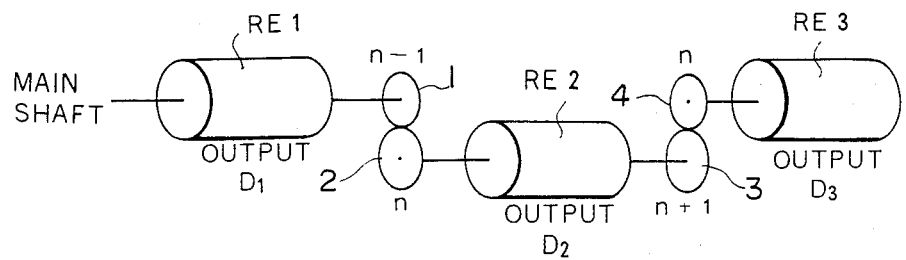
FIG. 1 is a diagram schematically showing an embodiment of the system according to the invention.

Referring first to FIG. 1, the principle of the invention will be described. FIG. 1 shows an example wherein the absolute position of the main shaft over multiple rotations is detected using three absolute rotary encoders RE1, RE2, and RE3 as the detectors. The encoders RE1 to RE3 respectively output as electric signals the rotational position detection signals that designate the rotational positions in one rotation of the respective rotors (not shown) by the absolute addresses with accuracy of one N-th of one rotation (N being an integer). The first rotary encoder RE1 is connected to the main shaft so as to detect the rotation of the main shaft. The rotation, i.e., the object of detection, is given to the main shaft. On the rotary shaft of the first rotary encoder RE1 is mounted a gear 1 with n−1 teeth (n being an integer) which is coupled to be in meshing engagement with a gear 2 with n teeth mounted on the rotary shaft of the second rotary encoder RE2. The second rotary encoder RE2 is provided with another gear 3 having n+1 teeth that in turn engages with a gear 4 with n teeth mounted on the rotary shaft of the third encoder RE3.

Accordingly, one rotation of the main shaft causes the encoder RE1 to accomplish one rotation, RE2 to make $(n-1)/n$ rotations and RE3 $(n-1)(n+1)/n^2$ rotations. Suppose $D_1$, $D_2$, and $D_3$ represent the rotational positions (absolute addresses in one rotation of the rotors) detected by the respective encoders RE1, RE2, and RE3. $D_1$ is equal to N at the time the main shaft has accomplished one rotation (provided N, designating a maximum rotational position, is equivalent to 0 at the origin) while $D_2$ and $D_3$ are as follows.

$$D_1 = N \qquad (1)$$
$$D_1 = N(n-1)/n$$
$$D_3 = N(n-1)(n+1)/n^2$$

Namely, the outputs $D_1$ to $D_3$ the encoders RE1 to RE3 change respectively with predetermined periods according to the displacement of the main shaft (the rotational displacement from the origin over multiple rotations) and the amounts of displacement of the main shaft corresponding to these periods (angle of rotation below one rotation or more) are different between the encoders RE1 to RE3. Specifically, the amount of displacement P1, i.e. angle of rotation of the main shaft corresponding to the one period of the first encoder RE1 is $2\pi$ radians (i.e. one rotation), the amount of displacement P2, i.e. angle of rotation of the main shaft corresponding to the one period of the second encodre RE2, is $n \cdot 2\pi/(n-1)$ radians (i.e. $(n-1)/n$ rotations) and the amount of displacement P3, i.e. angle of rotation of the main shaft corresponding to the one period of the third encoder RE3, is $n^2 \cdot 2\pi/(n-1)(n+1)$ radians (i.e. $(n-1)(n+1)/n^2$ rotations).

Figure 7:
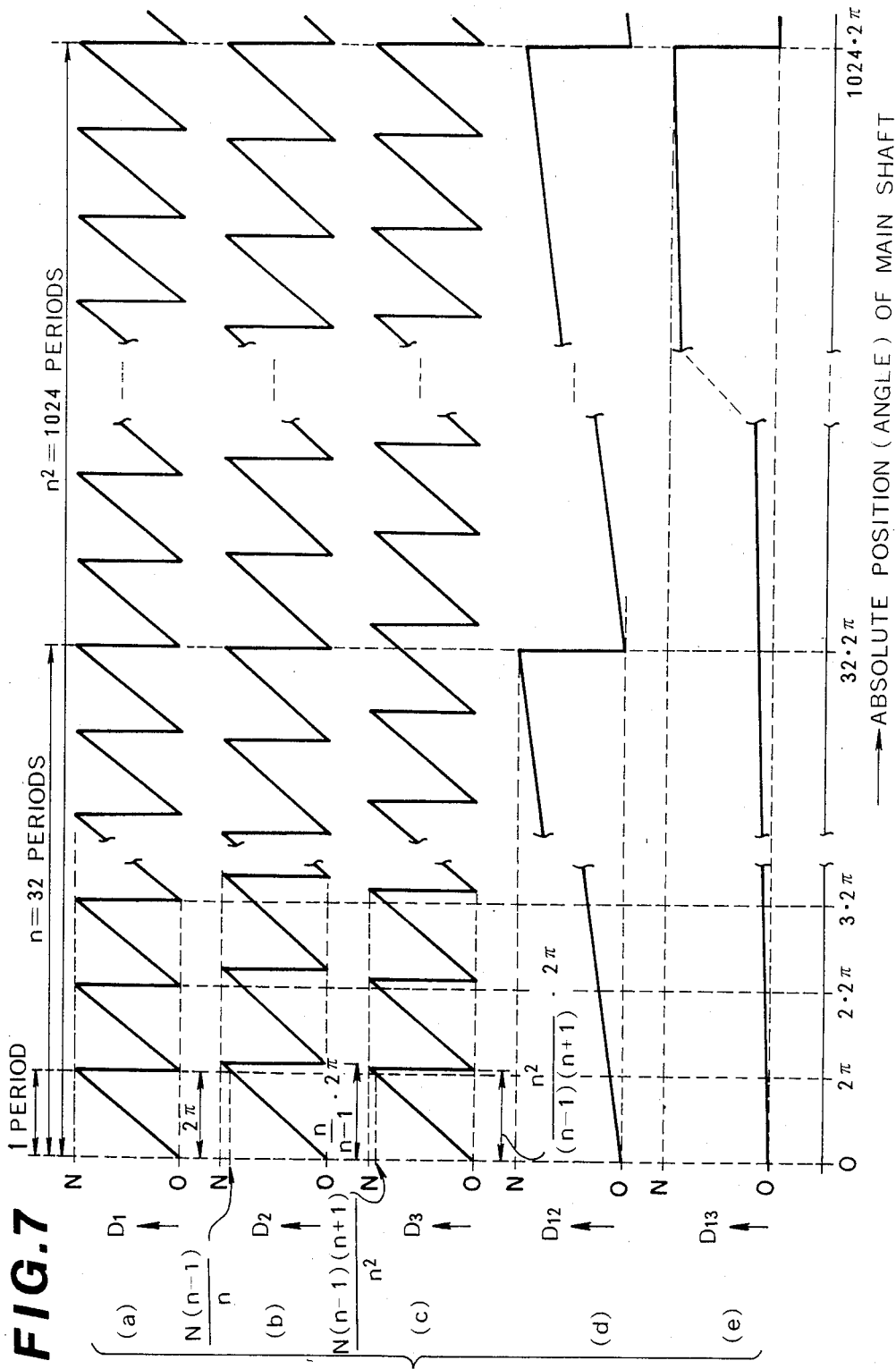
FIGS. 7(a), (b) and (c) are diagram showing states of the output signals of the three encoders in FIG. 1 in which the horizontal axis represents an absolute position of the main shaft and the vertical axis represents the value of the output signal.
FIG. 7(d) is a diagram showing a state of difference between the output signals of the first and second encoders in which the horizontal axis represents the absolute position of the main shaft and the vertical axis represents the value of difference.
FIG. 7(e) is a diagram showing a state of difference between the output signals of the first and third encoders in which the horizontal axis represents the absolute position of the main shaft and the vertical axis represents the value of difference.

FIG. 7(a), (b), and (c) show the periodic change of the output signals $D_1$ to $D_3$ of the encoders RE1 to RE3, the horizontal axis representing the position of the main shaft or its absolute angle of rotation from the origin over multiple rotations and the vertical axis representing the values of the output signals $D_1$, $D_2$, and $D_3$. When the main shaft has halted at a certain absolute position (i.e. at an absolute angle of rotation), the output signals $D_1$ to $D_3$ corresponding to that position are each obtained from the encoders RE1 to RE3. As will be seen from FIG. 7, the values of the output signals $D_1$ to $D_3$ are always below one period. However, since the amount of displacement (angle of rotation) of the main shaft corresponding to one period of the output signals $D_1$ to $D_3$ are different from each other, the values of the output signals $D_1$ to $D_3$ make a particular combination according to the absolute positions given on the horizontal axis in FIG. 7. Specifically, a particular combination of the output signals $D_1$ to $D_3$ determines solely the number of periods of the output signal $D_1$ of the first encoder RE1 (i.e. absolute rotation number of the main shaft as counted from the origin) exactly corresponding to the amount of rotation of the main shaft. As a matter of course, such determination is made not only by the present values of the signals $D_1$ to $D_3$, but also by the data related to the amounts of displacement (or their differences) of the main shaft that correspond to the respective periods of the signals $D_1$ to $D_3$ and that caused the differences in these signals. The absolute position of the main shaft can be identified by the combination of the thus obtained number of periods of the output signal $D_1$ of the first encoder RE1 and the present value of the signal $D_1$.

The number of periods of the output signal $D_1$ of the first encoder RE1 may be determined by an algebraic or mathematical method using the present values of the signals $D_1$ to $D_3$ and the data relating to the amounts of displacement of the main shaft corresponding to the respective one periods of the signals $D_1$ to $D_3$ (i.e., the data relating to the degree of transmission of the movement of the main shaft to the encoders RE1 to RE3). Of all the feasible manners of operation for that purpose, the most efficient in terms of operation time and operation circuit configuration is the manner using constants relating to the differences between one period of the first encoder RE1 and one period of the other encoders RE2 and RE3 together with the differences between the present value of the first encoder RE1 and the present values of the other encoders RE2 and RE3. For example, said constant may be determined with one period of the first encoder RE1 as a basis, considering the amounts of change in the outputs $D_2$ and $D_3$ of the other encoders RE2 and RE3 corresponding to the amount of displacement of the main shaft that causes a change per one period in the output signal $D_1$ of the first encoder RE1 (displacement therefore of one rotation).

Specifically, since the values of the output signals $D_2$ and $D_3$ of the encoders RE2 and RE3 corresponding to the change per one period (one rotation of the main shaft) in the output signal $D_1$ of the first encoder RE1 are known, the differences $D_1-D_2$ and $D_1-D_3$ between that output $D_1$ of the first encoder and the corresponding outputs $D_2$ and $D_3$ of the other encoders may be used as the constants.

Thus, the difference $D_{12}=D_1-D_2$ between the outputs $D_1$ and $D_2$ of the first and second encoders RE1 and RE2 per one rotation of the main shaft, i.e. one period of RE1, may be expressed from the equation (2) as follows.

$$\text{The amount of change in } D_{12} \text{ per one rotation of the main shaft} = N/n \quad (2)$$

Therefore, the absolute rotation number $R_x$ of the main shaft as counted from the origin (or the number of periods of the output $D_1$ of the encoder RE1) may be obtained by dividing the difference $D_{12}$ between the present outputs $D_1$ and $D_2$ of the encoders RE1 and RE2 by the constant $N/n$ representing the difference $D_{12}$ per one rotation as below. The origin herein means the point at which the outputs $D_1$, $D_2$, and $D_3$ of the encoders RE1, RE2, and RE3 are all 0s.

$$R_x = D_{12} \div N/n \quad (3)$$

wherein $$D_{12} = D_1 - D_2 \quad (4)$$

and, since $D_1$ and $D_2$ change at modulo n in accordance with the rotation n and the rate of change of $D_2$ is smaller than that of $D_1$ by a ratio of $(n-1)/n$, the mere difference $D_1-D_2$ can be a negative number. When the mere difference $D_1-D_2$ is negative, it may be added with N so that $D_{12}$ always represents the effective difference between $D_1$ and $D_2$. In the practical operation, however, N need not be expressly added: performing the operation $D_1-D_2$ using the complement of $-D_2$ with N as the carry and discarding the sign bit gives the effective difference $D_{12}$ which is equivalent to the addition of N. The state of the effective difference $D_{12}$ in relation to the absolute position of the main shaft is shown in FIG. 7(d).

Combining the integer section of the absolute rotation number $R_x$ obtained by the equation (3) with the rotational position detection output $D_1$ of the first encoder RE1 (i.e. discarding the decimal section of $R_x$ and placing $D_1$ instead as the decimal section) yields the absolute rotational position detection value over multiple rotations.

When the absolute rotation number $R_x$ of the main shaft (i.e. the number of periods of the output $D_1$ of the first encoder RE1) reaches n, the difference $D_{12}$ becomes N (that is, N=0), whereupon further detection of the absolute rotation number is made impossible (see FIG. 7). Thus, the first and second encoders RE1 and RE2 can only detect up to n rotations (n periods of RE1). The third encoder RE3 therefore is provided to extend the absolute position detection range. Specifically, since the rotation number $R_x$ (or the number of periods of RE1) obtained based on the difference $D_{12}$ between the present values of the $D_1$ and $D_2$ is a periodic signal having a period of a predetermined value n, the third encoder RE3 is provided to find the number of periods of this periodic signal, thereby extending the absolute position detection range.

From the equation (1), the difference $D_{13}=D_1-D_3$ between the outputs $D_1$ and $D_3$ of the first and third encoders per one rotation of the main shaft (one period of RE1) may be expressed as follows:

$$\text{The amount of change in } D_{13} \text{ per one rotation of the main shaft} = N/n^2 \quad (5)$$

From the equations (3) and (5), the relation between the changes in $D_{12}$ and $D_{13}$ per one rotation of the main shaft (one period of RE1) can be expressed as follows:

$$D_{13} = D_{12}/n \quad (6)$$

As will be seen, the difference $D_{13}$ changes with the rotation of the main shaft at one n-th of the rate at which the difference $D_{12}$ changes.

Also, it is known from the equation (5) that dividing the difference $D_{13}$ between the present outputs $D_1$ and $D_3$ of the first and third encoders RE1 and RE3 directly by the above constant $N/n^2$ which represents the difference $D_{13}$ per one rotation gives the absolute rotation number (or the number of periods of RE1) $R'_x$ as shown below.

$$R'_x = D_{13} \div N/n^2 \quad (7)$$

However, since the divisor in the equation (7) is one n-th that of the equation (3), the operation of the equation (7) has a poorer resolution and the error in $D_{13}$ has a relatively great effect on $R'_x$. However, finding from the equation (6) the value $N/n$ of $D_{13}$ when $D_{12}$ assumes the maximum value N (O) and dividing the difference $D_{13}$ by $N/n$ leads to $$D_{13} \div N/n = R_y \quad (8)$$

$R_y$ equals $R_x$ the equation (3) in accuracy. Now the equations (7) and (8) lead to the following equation:

$$R'_x = R_y \cdot n \quad (9)$$

It follows therefore that the value $R_y$ obtained from the equation (8) is n-th the value $R'_x$ or the absolute rotation number (number of periods of RE1) so that $R_y$ is a value which increases by one each time the main shaft completes n rotations as counted from the origin (i.e. every n periods of RE1 or every n periods of $R_x$). On the other hand, the value $R_x$ obtained from the equation (3) based on the difference $D_{12}$ does not indicate the absolute rotation number (the periods of RE1 or $D_1$) exceeding n as mentioned above, showing the values from 0 to n repeatedly in respect of the rotation numbers exceeding n (n−1, strictly, since n is equivalent to 0). Therefore, the absolute rotation number (the number of periods of RE1 or $D_1$) may be detected in a wide range by combining the integer section of $R_y$ obtained from the equation (8) as the major absolute rotation number (period data) with n absolute rotations (n periods of $D_1$) as unit and the integer section of $R_x$ obtained from the equation (3) as the minor absolute rotation number (period data) with one absolute rotation (one period of $D_1$) as unit. Namely, $R_x$ represents the number of periods of $D_1$ in modulo n and further, $R_y$ represents the number of periods of $R_x$ in modulo n. Therefore, the absolute rotation number (the number of periods of $D_1$) $R'_x$ obtained by this combination may be expressed as follows.

$$R'_x = R_y \cdot n + R_x \quad (10)$$

Referring to the equation (8), $$D_{13} = D_1 - D_3 \quad (11)$$

and, just like $D_{12}$ of the equation (4), the mere difference $D_1 - D_3$ can be a negative number, in which case the mere difference $D_1 - D_3$ as added with N is used as the effective difference but in the actual operation, N need not be expressly added as in the case of $D_{12}$. When the absolute rotation number $R_x'$ of the main shaft is $n^2$, the difference $D_{13}$ is N (0) from the equation (5), so no further detection of the absolute rotation number is possible. Thus, the absolute rotation number detection range is extended up to $n^2$ rotations by the addition of the third encoder RE3. FIG. 7(e) shows the effective difference $D_{13}$ in relation to the absolute position of the main shaft. As will be seen, one period of $D_{12}$ corresponds to n (e.g. 32) periods of $D_1$ and one period of $D_{13}$ to $n^2$ (e.g. 1024) periods of $D_1$.

It will be understood from the above description that use of more than three encoders could extend the absolute position detection range further. When a fourth encoder is added, for example, the main shaft movement transmission ratio may be set such that one period of the difference $D_{14}$ between the output $D_4$ of the fourth encoder and the output $D_1$ of the first encoder RE1 corresponds to a plurality of periods of $D_{13}$. Thus, the number of periods of $D_{13}$ or the periods of $R_y$ may be set by using $D_{14}$. In this way, a plurality of encoders may be provided such that their respective periods correspond to the different amounts of displacement of a detected object. For that purpose, generally the condition P1<... P5<P4<P3<P2 must be satisfied where P1 represents the amount of displacement of the object (main shaft) per one period of the first encoder RE1 which constitutes a reference (P1 is $2\pi$ radians in the above case) and P2, P3, P4, P5 ... represent the amounts of displacement of the object (main shaft) per respective one periods of the second, third, fourth, fifth, ... encoders RE2, RE3, ... (P2 is $(n/(n-1)) \cdot 2\pi$ radians and P3 is $(n^2/(n-1)(n+1)) \cdot 2\pi$ radians in the above case).

Figure 2:
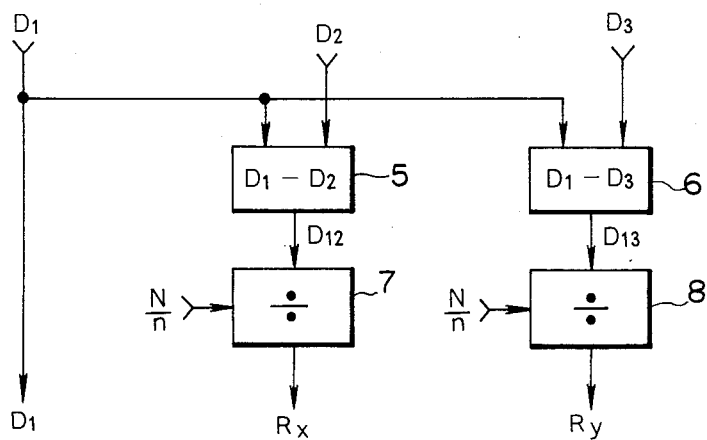
FIG. 2 is a block diagram showing the principle of operation processing in the embodiment shown in FIG. 1.

As described above, the absolute rotational position over multiple rotations can be obtained within the range of from the origin to $n^2$ rotations by executing the operations of the equations (3) and (8) based on the absolute rotational position detection signals $D_1$, $D_2$, and $D_3$ within one rotation (shorter than one period) outputted from the three encoders RE1, RE2, and RE3. The format of those absolute rotational position detection signals consists of $D_1$, $R_x$, and $R_y$, the output $D_1$ of the first encoder RE1 having the least significant weight, $R_x$ obtained from the equation (3) having a more significant weight over $D_1$, and $R_y$ obtained from the equation (8) having a more significant weight over $R_x$. Therefore, the absolute rotational position detection signals consisting of the combinations of those three data can indicate the absolute rotational position up to $n^2$ rotations with accuracy of one N-th of one rotation. FIG. 2 is a block diagram showing a basic circuit configuration that executes the operations of the equations (3) and (8) comprising a subtractor 6 and dividers 7 and 8.

The constants N and n may be determined in an appropriate manner but N is usually set at a relatively great value for an enhanced accuracy and n also is preferably set at a relatively great value for an extended detection range. However, if n is too close to N, the divisor N/n of the equations (3) and (8) becomes small so that the accuracy with which $R_x$ and $R_y$ may be obtained decreases. Also n is preferably a divisor of N for convenience in the operation. As a preferred example, the constants N and n may be determined so that $N = n^2$. With $N = 1024$ and $n = 32$, for example, the absolute rotational position can be detected as accurately as to one 1024th of one rotation (one period of RE1) within the range of 1024 rotations (1024 periods of RE1).

While in the above example, the speed of rotation decreases in a ratio of n to n−1 from the first rotary encoder RE1 to the second rotary encoder RE2, and increases in a ratio of n to n+1 from the second encoder RE2 to the third encoder RE3, the speed of rotation may, conversely, be adapted to increase in a ratio of n−1 to n from RE1 to RE2 and decrease in a ratio of n+1 to n from RE2 to RE3. In that case, the equations, if not entirely the same as the equations (1) to (11), may be readily formed on the analogy of those equations and will therefore not be shown here. The ratios of the turning speeds of the encoders RE1, RE2, and RE3 to one another are not limited to n−1 to n and n+1 to n but may be n−a to n or n+a to n, provided that a is small enough in relation to n and is a divisor of n. In that case, the divisor in the equations (3) and (8) should be aN/n.

Figure 3:
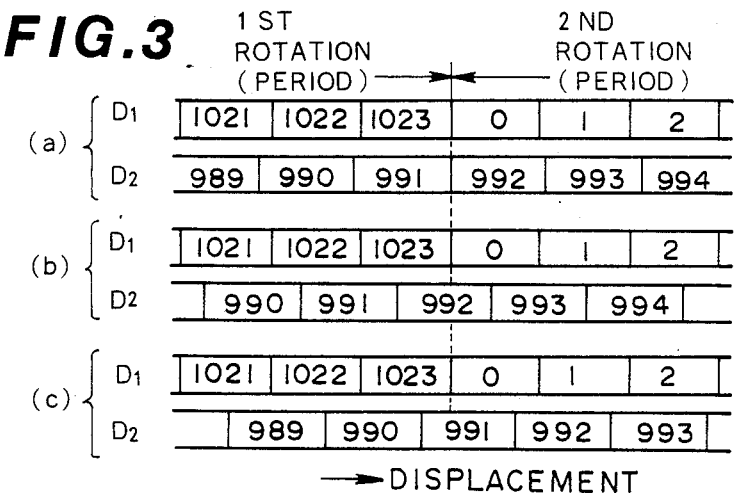
FIG. 3 is a diagram showing an example of outputs of first and second rotary encoders for explaining possibility of error occurring in the vicinity of the change point of the number of periods (rotation number)

The combination of the encoder output $D_1$ together with the absolute rotation numbers $R_x$ and $R_y$ obtained merely from the equations (3) and (8) could lead to the following error. For example, FIGS. 3(a), (b), and (c) each show the states of the encoder outputs $D_1$ and $D_2$ as the main shaft that has completed its first rotation initiates its second, with $N = 1024$ and $n = 32$. FIG. 3(a) shows a case where no error is seen in the encoder outputs $D_1$, $D_2$ and $D_3$, FIG. 3(b) shows a case where $D_2$ "gains", and FIG. 3(c) shows a case where $D_2$ "loses". Even in normal cases, as shown in FIG. 3(a), $D_1 - D_2$ reads "32", i.e., "n" of the regions immediately before change in the rotation number, i.e., a fresh rotation is initiated, and in these regions the rotation number $R_x$ obtained from the equation (3) is 1, which is not correct. The reason for this will be described below. While, theoretically, the value $D_1-D_2$ changes continuously as $D_1$ and $D_2$ respectively vary, the value $D_1-D_2$ makes one step of change for every n steps made by $D_1$. Further, the steps of change are different between $D_1$ and $D_2$ and the gap between their steps grow larger gradually. During the theoretic one step of change of $D_1-D_2$ (i.e. n steps of $D_1$), the actual value of $D_{1-D2}$ does not remain the same but rather alternates the theoretic value with this theoretic value added with a 1, the theoretic value added with a 1 occurring more frequently as the rotation advances until the actual value of $D_1-D_2$ changes to the theoretic value (theoretic value at the preceding step added with a 1) when the theoretic step of change advances to the next step. Thus in the range of $992 \leq D_1 \leq 1023$ (generally, $N-n \leq D_1 \leq N-1$), where the theoretic value of $D_{12}$ changes from 31 to 32, $D_{12}$ could be n=32 as seen from FIG. 3(a). Therefore, although the combination of $D_1=1023$ and $D_2=991$, for example, really corresponds to the 1023rd address in the first rotation ($R_x=0$), mere application of the equation (3) yields $R_x=1$ since $D_{12}=32$, thereby erroneously locating the rotational position at the 1023rd address in the second rotation. In cases where an error as shown in FIG. 3(b) has arisen, simple application of the equation (3) for $D_1=0$ and $D_2=992$, for example, yields $R_x=1$, thereby correctly locating the absolute rotational position at the 0th address in the second rotation but for $D_1=0$ and $D_2=993$, the equation (3) yields $R_x=0$, thereby erroneously locating the absolute rotational position at the 0th address in the first rotation. In cases where an error as shown in FIG. 3(c) has arisen, simple application of the equation (3) for $D_1=1023$ and $D_2=990$ yields $R_x=1$, erroneously indicating the 1023rd address in the second rotation rather than the correct 1023rd address in the first rotation.

In order to improve such erroneous operation, therefore, $D_{12}$ in the equation (3) is amended according to the rotational position of the main shaft, i.e. the output $D_1$ of the encoder RE1 as follows;

When $0 \leq D_1 \leq 511$ (generally, $0 \leq D_1 \leq N/2-1$), $$R_x=(D_{12}+k)\div N/n \qquad (3-1),$$

and when $512 \leq D_1 \leq 1023$ (generally, $N/2 \leq D_1 \leq N-1$)

$$R_x=(D_{12}-k)\div N/n \qquad (3-2),$$

wherein k is an integer suitably set according to the range of permissible error. Where, for example, error up to eight division units is permissible, k=8.

By amending the equation (3) to the equation (3-1) or (3-2), such erroneous operation can be improved as follows: In the case shown in FIG. 3(a), first of all, since the angle of rotation immediately before the change in the rotation number within the range of $512 \leq D_1 \leq 1023$, the equation (3-2) is applied, whereby the difference of $D_1-D_2=D_{12}$ and the constant k (e.g. 8) are divided by the constant N/n. Thus for $D_1=1023$ and $D_2=991$, for example, since $D_{12}-k=1023-991-8=24$, $R_x=0$ so that the correct 1023rd address in the first rotation is obtained. In the range of $0 \leq D_1 \leq 511$ of the case shown in FIG. 3(a), the equation (3-1) is applied, whereby for $D_1=0$ and $D_2=992$, for example, since $D_{12}+k=1024-992+8=40$, $R_x=1$ so that the correct rotational position is located without fail. In the case of FIG. 3(b), the equation (3-1) is applied in the range under the influence of error immediately after the change in the rotation number, whereby for $D_1=0$ and $D_2=993$, for example, since $D_{12}+k=1024-993+8=39$, $R_x=1$ so that the correct position is located. In the range free from the influence of error, the equation (3-1) or (3-2) may be applied to locate the correct position. In the case shown in FIG. 3(c), in the range under the influence of error immediately before the change in the rotation number, the equation (3-2) is applied, whereby for $D_1=1023$ and $D_2=990$, for example, since $D_{12}-k=1023-990-8=25$, $R_x=0$ so that the correct position is located. In the region free from the influence of error, the equation (3-1) or (3-2) may be applied to locate the position correctly.

Erroneous operation similar to that relating to $D_{12}$ which may occur immediately before or after the change in the rotation number may be observed in respect of $D_{13}$ as well. Such erroneous operation in respect of $D_{13}$, however, may occur immediately before or after a carry of $D_{12}$ (i.e., change of $D_{12}$ from N−1 to N=0). For improvement of such erroneous operation, therefore, $D_{13}$ in the equation (8) is amended, as in the above case, according to the range of $D_{12}$ as follows;

When $0 \leq D_{12} \leq 511$ (generally, $0 \leq D_{12} \leq N/2-1$)

$$R_y=(D_{13}+k)\div N/n \qquad (8-1),$$

and when $512 \leq D_{12} \leq 1023$ (generally $N/2 \leq D_{12} \leq N-1$)

$$R_y=(D_{13}-k)\div N/n \qquad (8-2)$$

Figure 4:
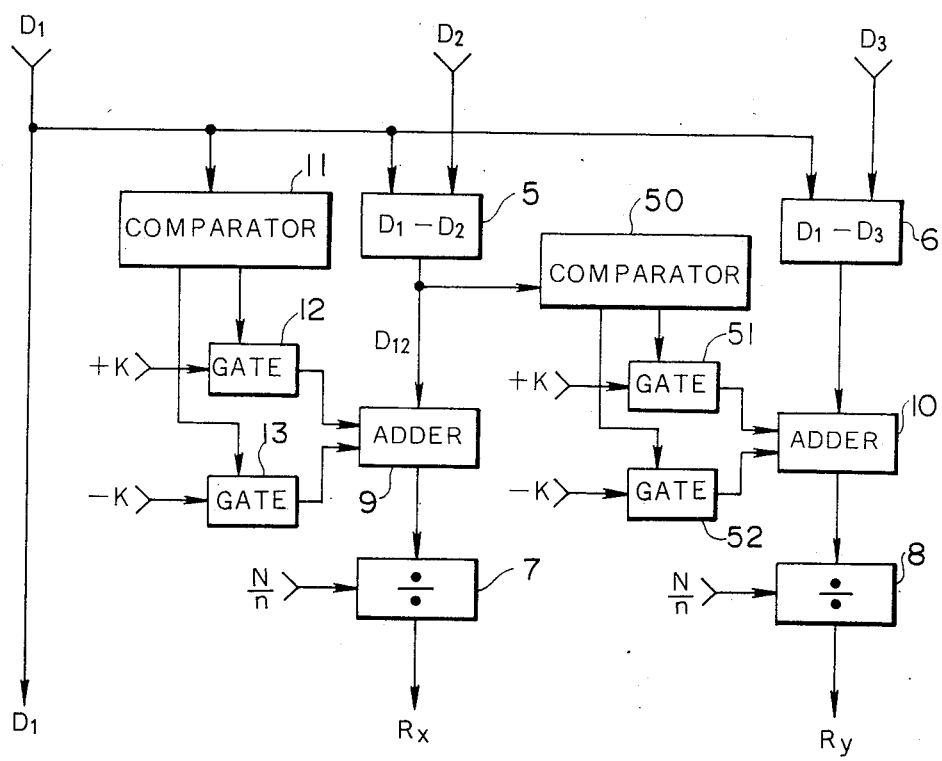
FIG. 4 is a block diagram showing the principle of an improved example of the operation processing shown in FIG. 2.

For execution of the equations (3-1), (3-2), (8-1), and (8-2), the circuitry shown in FIG. 2 may be modified as shown in FIG. 4. In the circuit shown in FIG. 4, adders 9 and 10 are respectively provided between the subtractors 5 and 6 and dividers 7 and 8. Comparators 11 and 50 find out the ranges to which $D_1$ and $D_2$ belong and open either the gate 12 or 13 and either the gate 51 or 52 depending on the ranges found so as to supply +k or −k to the adders 9 and 10, thereby adding or subtracting k to or from $D_{12}$ and $D_{13}$. The range of $D_1$ in which the equations (3-1), (3-2), (8-1), and (8-2) are applied may of course be limited to relatively a narrow region immediately before or after the change in the rotation number, using the equations (3) and (8) in the other region.

In a case where there is no error at all in the encoder outputs $D_1$, $D_2$ and $D_3$, no error shown in FIGS. 3(b) and 3(c) and the error shown in FIG. 3(a) has only to be considered. For this purpose, which of "$0 \leq D_1 \leq N-n$" and "$N-n \leq D_1 \leq N-1$" $D_1$ belongs to is judged. If $D_1$ belongs to the former, the above formula (3) is directly used whereas if $D_1$ belongs to the latter, "$D_{12}-1$" is used instead of "$D_{12}$" in the formula (3). As to $D_{13}$, judgement as to which of "$0 \leq D_{12} \leq N-n$" and "$N-n \leq D_{12} \leq N-1$" $D_{13}$ belongs to is similarly made and the formula (8) is directly used or "$D_{13}-1$" is used instead of "$D_{13}$".

As the rotary encoders RE1, RE2 and RE3, any desired absolute encoder such as a resolver and of the variable magnetic reluctance type phase shift rotation angle detection device as disclosed in the specifications of U.S. patent application No. 311277 and German Patent Application No. P3141015.4 may be employed. An example in which the variable magnetic reluctance type phase shift rotation angle detection device disclosed in the above described specifications is employed for carrying out the present invention is shown in FIGS. 5 and 6.

Figure 5:
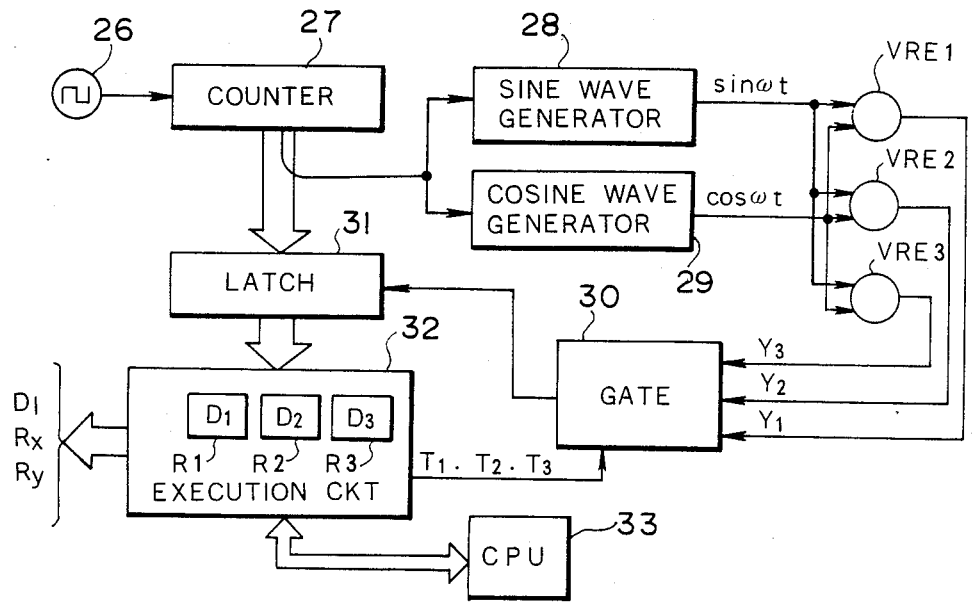
FIG. 5 is a block diagram showing schematically an electrical processing system of an embodiment of the invention in a case where a rotation angle detector of a variable reluctance type is used as the rotary encoder.
Figure 6A:
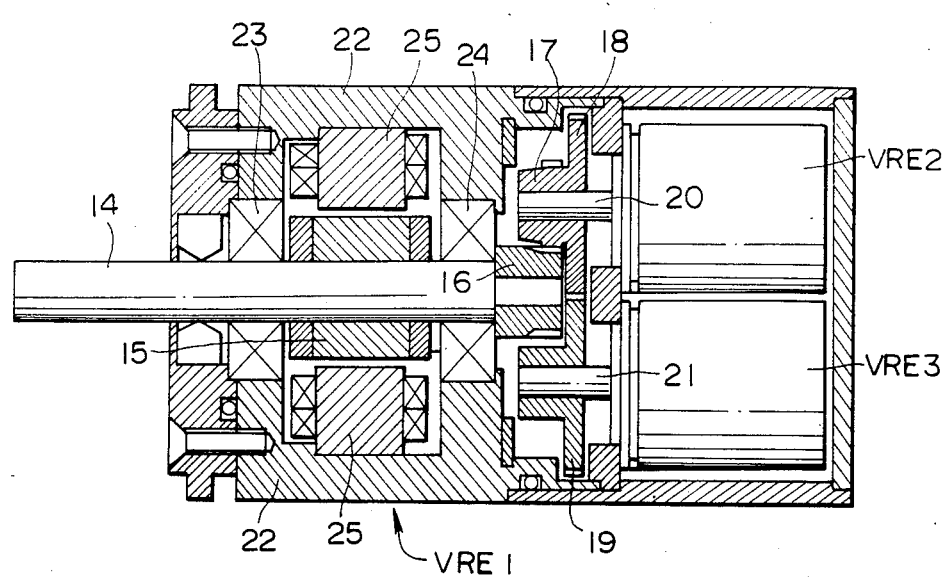
FIG. 6(a) is an axial sectional view showing an example of constructions of three rotary encoders in FIG. 5.
Figure 6:
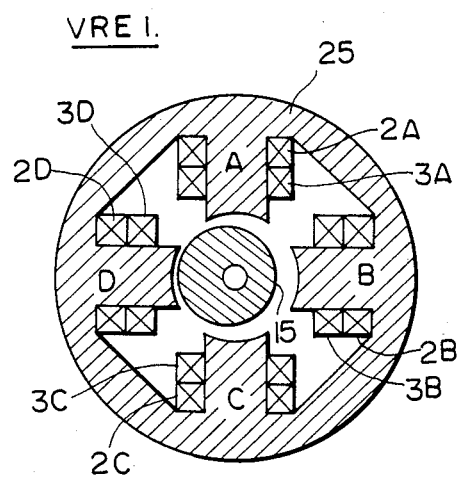
FIG. 6(b) is a radial sectional view of one of the encoders shown in FIG. 6(a)

In FIG. 5, VRE1, VRE2 and VRE3 respectively denote detection head sections of the variable magnetic reluctance type phase shift rotation angle detection device, respectively corresponding to detection head sections RE1, RE2 and RE3 in FIG. 1. FIG. 6(a) is an axial sectional view showing the construction of VRE1, VRE2 and VRE3 and FIG. 6(b) is a radial sectional view of the detection head VRE1. In FIG. 6(a), the first detection head is shown in section whereas the second and third detection heads VRE2 and VRE3 are shown as side views. The diameter of the detection heads VRE2 and VRE3 is about half that of the detection head VRE1. A rotor 15 of VRE1 is secured to the main shaft 14. A gear 16 is provided on one end of the main shaft 14. This gear 16 is in meshing engagement with a gear 17 provided on a rotation shaft 20 of VRE2. A gear 18 provided also on the shaft 20 is meshed with a gear 19 provided on a rotation shaft of VRE3. The numbers of the teeth of the gears 16, 17, 18 and 19 are n, n−1, n+1 and n, the same numbers as in the gear wheels 1, 2, 3 and 4 in FIG. 1.

Reference character 22 designates a casing of the detection head VRE1, 23 and 24 bearings, and 25 a stator core of VRE1, respectively. As shown in FIG. 6(b), the detection head VRE1 has poles A, B, C and D in the stator 25, primary coils 2A–2D and secondary coils 3A–3D being wound on the respective poles A–D. The rotor 15 is of such a configuration, e.g. an offset roller, as is capable of changing reluctance of each pole depending upon the rotation angle. By exciting the primary coils 2A and 2C of the poles A and C which constitute a pair in the radial direction by a sine wave signal and exciting the primary coils 2B and 2D of the poles B and D which constitute another pair by a cosine wave signal, the following signal is obtained as a composite output $Y_1$ of the secondary coils 3A–3D. The other detection heads VRE2 and VRE3 are of the same construction and the following signals are obtained as secondary outputs $Y_2$ and $Y_3$:

$$\left.\begin{array}{l} Y_1 = \sin(\omega t - \theta_1) \\ Y_2 = \sin(\omega t - \theta_2) \\ Y_3 = \sin(\omega t - \theta_3) \end{array}\right\} \quad (12)$$

$\theta_1$, $\theta_2$ and $\theta_3$ are angles of rotation of the rotation shafts 14, 20 and 21 of the detection heads VRE1-VRE3. The outputs $Y_1$, $Y_2$ and $Y_3$ are obtained by phase-shifting a reference AC signal $\sin \omega t$ by phase angles corresponding to the respective angles of rotation. Accordingly, absolute value data $D_1$, $D_2$ and $D_3$ representing rotational positions within a single rotation can be calculated by respectively measuring the phase differences $\theta_1$, $\theta_2$ and $\theta_3$ at these output signals $Y_1$, $Y_2$ and $Y_3$.

In FIG. 5, a counter 27 counts an output clock pulse of a clock oscillator 26. A part of the count output is supplied to a sine wave generator 28 and a cosine wave generator 29. In response to the count output, a sine wave signal $\sin \omega t$ and a cosine wave signal $\cos \omega t$ synchronized with the count output are generated. These signals are supplied to the primary coils of the detection heads VRE1-VRE3 as was previously described. The secondary coil output signals $Y_1$, $Y_2$ and $Y_3$ are provided at a gate circuit 30. The gate circuit 30 selects the respective signals $Y_1$, $Y_2$ and $Y_3$ on a time shared basis in response to timing signals $T_1$, $T_2$ and $T_3$ and supplies them to a load control input of a latch circuit 31 after multiplexing these signals. The latch circuit 31 latches the count in the counter 27 in synchronism with a rising timing (zero cross timing) of the signal $Y_1$, $Y_2$ or $Y_3$ supplied by the gate circuit 30. An execution circuit 32 implements various functions, being controlled by a central processing unit (CPU). The circuit 32 includes registers R1, R2 and R3 for storing the outputs $D_1$, $D_2$ and $D_3$ of the detection heads VRE1, VRE2 and VRE3 and stores the digital data latched by the latch circuit 31 in register R1, R2 or R3 corresponding to the signal selected by the gate circuit 30 (one of $Y_1$, $Y_2$ and $Y_3$ whch can be discriminated by the timing signal $T_1$, $T_2$ or $T_3$). The execution circuit 32 implements, in response to the encoder outputs $D_1$, $D_2$ and $D_3$ stored in the registers R1, R2 and R3 and predetermined operation constants N, n, N/n, k etc., operations of the formulas (4) and (11), formula (3-1) or (3-2) and formula (8-1) or (8-2) and the comparison and judgement of the range of $D_1$ accompanying these operations and thereupon outputs the data $D_1$, $R_x$ and $R_y$ representing the absolute rotational positions within $n^2$ rotations.

In the above described embodiment, one period of the output signals $D_1$–$D_3$ of the encoders RE1-RE3 coincides with one rotation of the respective rotors. The encoders RE1-RE3, however, are not limited to this construction but encoders which generate the output signals $D_1$–$D_3$ at a plurality of periods for a single rotation may be employed as the encoder RE1-RE3. If, for example, encoders RE1-RE3 which respectively generate the output signals $D_1$–$D_3$ at 9 periods for single rotation (i.e., the absolute position can be detected for each rotation angle of 40°) are employed, one period in FIG. 7(a) corresponds not to $2\pi$ radian but to $2\pi/9$ radian, i.e., 40° and the absolute detection range for $n^2$ periods is "$1024/9 \cdot 2\pi$". An example of a detection head VRE1' used for this purpose is illustrated in FIG. 8.

Figure 8:
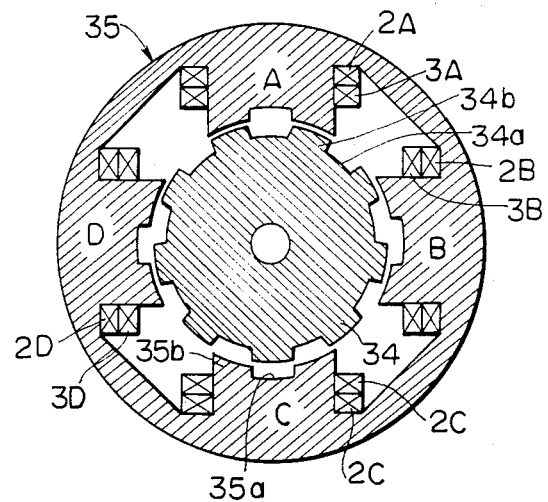
FIG. 8 is a diagram showing, in a radial sectional view as in FIG. 6(b), an example of an absolute rotary encoder having an output signal change of a plurality of periods per rotation.

FIG. 8 shows an example in which the detection head VRE1 shown in FIG. 6(b) has been modified to a type in which the output signal $D_1$ is generated at a plurality of periods for a single rotation. A rotor 34 is not offset as in the rotor 15 in FIG. 6 but teeth each consisting of an axial groove 34a and an axial projection 34b are provided at an equal pitch on the outer periphery of the rotor 34. A stator 35 includes, just as the stator 25 in FIG. 6, four poles A–D having primary coils 2A–2D and secondary coils 3A–3D. The poles A–D have, at the end portions thereof, teeth (consisting of a groove 35a and a projection 35b) corresponding to the teeth 34a, 34b of the rotor 34. Reluctances of the poles A–D change with the rotation of the rotor 34, one pitch of the rotor teeth 34a, 34b constituting one period of the change in reluctance. Further, correspondence between the rotor teeth 34a, 34b and the stator teeth 35a, 35b of the respective poles A–D is shifted in such a manner that reluctance change in the poles A–D will be shifted by ¼ pitch between the respective adjacent poles. By this arrangement, an electrical phase difference whose one period is a rotation angle of one pitch of the rotor teeth 34a, 34b is produced in the secondary coil output signal and the output signal $D_1$ corresponding to this electrical phase difference represents a value less than one period corresponding to the rotational position of the rotor 34, with one period thereof being the rotation angle range for one pitch of the rotor teeth 34a, 34b.

The means for detecting displacement or position of the object for detection as an absolute value within one period (i.e., encoders RE1-RE3) is not limited to the above described rotary type device but may be of a linear type or combination of rotary and linear type devices. An example of a combination of detection heads S1, S2 of a linear type absolute position detector is illustrated in FIG. 9.

The individual linear position detection heads S1 and S2 are of a variable magnetic reluctance phase shift type as disclosed in the specifications of U.S. Pat. Application No. 348674 and German Patent Application No. P3205032.1. Description will first be made of the detection head S1. The detection head S1 includes a primary coil and a secondary coil received in a casing 36 and an elongated core section 37 slidably inserted in these coils. The core section 37 includes a plurality of cores 37a provided at a predetermined interval in the longitudinal direction, spacers 37b provided between the respective cores 37a and a sleeve 37c covering these cores 37a and the spacers 37b. The cores 37a are made of a magnetic material and the spacers 37b a non-magnetic material such as air. This core section 37a makes a linear displacement according to a linear movement provided from an outside object for detection. By way of example, each core 37a is of a cylindrical configuration with a length of $P_1/2$ ($P_1$ being a desired length) and each spacer 37b is of the same length as the core 37a. Accordingly, distance equivalent to one pitch in the arrangement of the cores 37a is $P_1$. Just as in the above described rotary type detection heads, the coils are provided in such a manner that they are operated in the four phases A–D. Reluctance produced in the respective phases A–D is shifted by 90° depending upon the positions of the cores 37a. If, for example, the phase A is a cosine phase, the phase B is a sine phase, C a minus cosine phase and D a minus sign phase.

Figure 9:
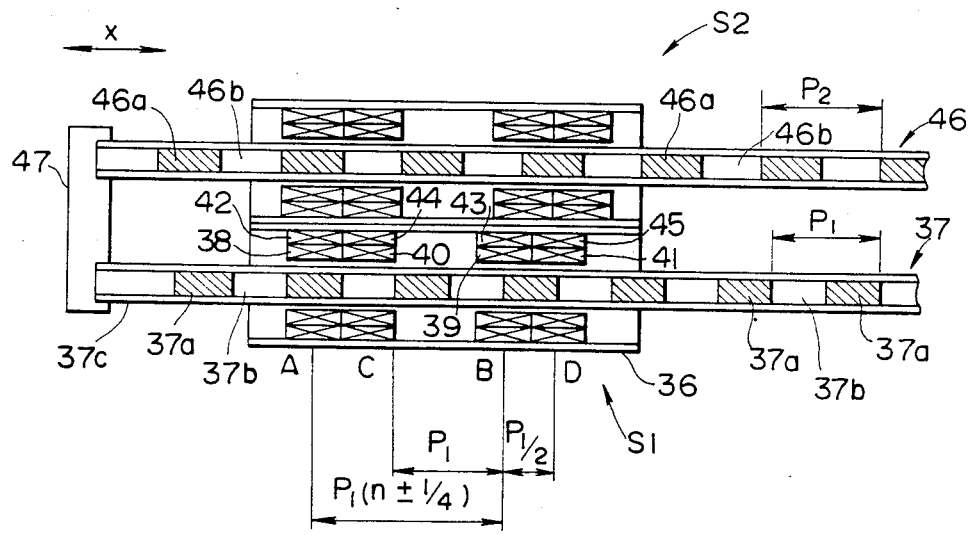
FIG. 9 is an axial sectional view showing an example in which the invention is implemented by employing a couple of linear type absolute position detectors.

In FIG. 9, primary coils 38, 39, 40 and 41 and secondary coils 42, 43, 44 and 45 are provided separately for the respective phases A–D. The secondary coils 42–45 of the respective phases A–D are wound respectively on the outside or inside of the corresponding primary coils 38–41. The length of each coil is substantially the same as the length of the core 37a, i.e., $P_1/2$. In the example of FIG. 9, the coils 38, 42 of the phase A and the coils 40, 44 of the phase C are provided side by side and the coils 39, 43 of the phase B and the coils 41, 45 of the phase D are provided side by side. The interval between the coils of the phase A and those of the phase B and the interval between the coils of the phase C and those of the phase D are both "$P_1(n\pm\frac{1}{4})$" (n being any integer).

Locations of the coils of the phases A–D in the detection head S1 are not restricted to those shown in FIG. 9. Since the reluctance in the magnetic circuit in the respective phases A–D changes in accordance with the linear displacement of the core section 37 and the phase of the reluctance change is shifted by 90° for each phase (accordingly, the phase of the reluctance change between the phase A and the phase C is shifted by 180° and the phase of the reluctance change between the phase B and the phase D also is shifted by 180°), the locations of the coils may be selected in any way so long as the locations will bring about such reluctance change.

In the same manner as in the above described detection heads VRE1-VRE3, the primary coils 38 and 40 of the phases A and C are excited by the sine wave signal $\sin \omega t$ in opposite phases to each other and the outputs of the secondary coils 42 and 44 are added together in the same phase. The primary coils 39 and 41 of the phases B and D are excited by the cosine wave signal $\cos \omega t$ in opposite phases to each other and the outputs of the secondary coils 43 and 45 are added together in the same phase. A sum of the outputs of the secondary coil pair of the phases A and C and the outputs of the secondary coil pair of the phases B and D constitutes a secondary side output signal $W_1$ of the detection head S1. This output signal $W_1$ is a signal obtained by shifting a reference AC signal ($\sin \omega t$ or $\cos \omega t$) by a phase angle $\phi_1$ corresponding to the linear position X of the core section 37 as expressed by the following equation (13).

$$\left. \begin{array}{l} W_1 = \sin(\omega t - \phi_1) \\ W_2 = \sin(\omega t - \phi_2) \end{array} \right\} \quad (13)$$

The detection head S2 is of the same construction as the detection head S1 except that interval $P_2$ between cores 46a and spacers 46b is different from the interval $P_1$. The core sections 37 and 46 of the detection heads S1 and S2 are connected to each other by means of a connecting member 47 and these core sections 37 and 46 are moved together in a linear movement in accordance with the linear displacement X of the object of detection. An AC signal $W_2$ as expressed by the above equation (13) which includes an electrical phase shift $\phi_2$ corresponding to the linear position X of the core section 46 is provided from the secondary side of the detection head S2.

The linear displacement X of the object for detection when the phase shift amount $\phi_1$ in the output signal $W_1$ of the first detection head S1 is $2\pi$ corresponds to the length $P_1$ of one pitch of the cores 37a whereas the linear displacement X when the phase shift amount $\phi_2$ in the output signal $W_2$ of the second detection head S2 is $2\pi$ corresponds to the length $P_2$ of one pitch of the cores 46a. This is because the reluctance change in the detection heads S1 and S2 is made with one pitch of the cores 37a and 46a taken as one period.

By processing the secondary output signals $W_1$ and $W_2$ of the detection heads S1 and S2 in the same manner as in FIG. 5, the phase shift amounts $\phi_1$ and $\phi_2$ can be counted. Thus, periodic electrical signals (digital signals) $D_1$ and $D_2$ whose one period is a linear displacement amount corresponding to the mutually different core pitches $P_1$ and $P_2$ of the detection heads S1 and S2 can be obtained in correspondence to the present position, i.e., in correspondence to the present phase shift amounts $\phi_1$ and $\phi_2$. The process for obtaining the number of periods $C_x$ of the output signal $D_1$ corresponding to the first detection head S1 by utilizing thus obtained digital signals $D_1$ and $D_2$ is entirely the same as in the previously described rotary type device. More specifically, since the value of the output signal $D_1$ of the first detection head S1 at the linear displacement amount $P_1$ is N and the value of the output signal $D_2$ of the second detection head S2 is $NP_1/P_2$, difference between the two values is $N(P_2-P_1)/P_2$, which is previously given as a known amount. Accordingly, by obtaining difference $D_{12}$ between the present output signals $D_1$ and $D_2$ of the detection heads S1 and S2 and performing division according to the following equation (14), the number of periods $C_x$ can be obtained:

$$C_x = D_{12} \div \frac{N(P_2 - P_1)}{P_2} \qquad (14)$$

By combining the integer section of the number of periods $C_x$ and the output signal $D_1$ of the detection head S1 (i.e., discarding the decimal section or surplus of $C_x$ obtained by the equation (14) and using $D_1$ as the decimal section), the linear position of the object for detection can be determined in an absolute value. As a modified embodiment, the core sections 37 and 46 may be fixed and coils may be moved in association with the displacement of the object of detection. The pitches of the cores of the detection heads S1 and S2 may be made equal to each other and the transmission ratios of mechanical movement of the object of detection relative to the respective detection heads S1 and S2 may be made different by employing a suitable means such as a gear.

The operation means for obtaining the numbers of periods $R_x$ and $R_y$ or $C_x$ of the first encoder RE1 or the detection head S1 is not limited to a calculation circuit such as a subtractor, divider etc. but may be one employing a function table consisting of a ROM, RAM or the like. The operation formula for such operation is not limited to the functions as in the equations (3), (8) and (14) but may be of any mathematic analysis employing displacement amounts P1, P2 and P3 of the object of detection for one period of the encoders RE1–RE3 (these are previously known values) and the present output signals $D_1$–$D_3$ of the encoders RE1–RE3. For example, the operation may be made by formulating the following simultaneous equations (15):

$$\left. \begin{array}{l} R(x) = X_1 \cdot P1 + D_1 \\ R(x) = X_2 \cdot P2 + D_2 \\ R(x) = X_3 \cdot P3 + D_3 \end{array} \right\} \qquad (15)$$

where $X_1$, $X_2$ and $X_3$ (unknown) represent the periods of the encoders RE1–RE3 and R(x) represents the absolute position of the object of detection, obtaining integer values of $X_1$, $X_2$ and $X_3$ which bring about the common R(x) value by substitution with respect to the present values $D_1$–$D_3$, and determining the value of $X_1$ thus obtained as the above described number of periods Rx.

It has previously described herein that the amounts of displacement P1, P2, P3, P4, P5 —of the object of detection corresponding to 1 period of the respective encoders RE1, RE2, RE3 —should be "P1<—P5<P-4<P3<P2". However, the order of the amounts of displacement may be "P1<P2<P3 P4<P5 —". In this latter case, it is possible to obtain the number of periods Rx of the first encoder RE1 by, for example, utilizing the difference in outputs of the first encoder RE1 and the second encoder RE2, obtain the number of periods $R_{x3}$ of the third encoder RE3 by utilizing the difference in outputs of the third encoder RE3 and the fourth encoder, and obtain the number of periods of the signal representing $R_x$ (corresponding to the previously described $R_y$) by utilizing the difference in outputs of the signal representing $R_x$ and the signal representing $R_{x3}$.

The combination of the gear for transmitting the displacement of the object of detection to the encoders RE1–RE3 is of course not limited to those shown in FIGS. 1 and 6. The means for transmission other than transmission gear may also be employed. For example, an equivalent effect to the transmission gear can be obtained by connecting a motor which is different from the motor driving the main shaft which is the object of detection to the second and third encoders RE2 and RE3 and driving this different motor inassociation with the main shaft driving motor but at a different predetermined ratio of rotation.

The encoders are not limited to a type which converts a mechanical displacement to an electrical signal but may be one which converts a mechanical displacement to an optical signal. Further, in the above described embodiments, the output signals $D_1$–$D_3$ of the encoders RE1–RE3 or S1 and S2 are obtained in a digital value but they may be obtained in an analog value.

We claim:

1. A system for detecting, in an absolute value, a position of an object which displaces mechanically from a predetermined origin comprising:
   a plurality of detectors each generating, at a predetermined period, an output signal representing an absolute value below one period;
   means for providing each of said detectors with a data signal representing the displacement of said object in such a manner that one period of each of said data signals corresponds to mutually different predetermined amounts of displacement of said object, which amounts of displacement differ from one another;
   determination means for determining the number of periods from said origin to the present position of said object with respect to a first one of said detectors, employing, as a parameter, the output signals of said respective detectors representing values below one period in correspondence to the present position of said object; and
   said present position of said object being identified in an absolute value by a combination of an integer section of the number of periods determined by said determination means and a value below one period represented by the output signal of said first detector,
   wherein each of said detectors comprises a primary winding means and a secondary winding means, a member displacing relatively with respect to said primary and secondary winding means and causing a periodic reluctance change to be produced in a magnetic circuit of said winding means in correspondence to said displacement, and output signal generation means,
   said primary winding means being excited by at least two reference AC signals out of phase with each other to produce in said secondary winding means an output AC signal which is derived from each of said reference AC signals by phase shifting it in accordance with the relative displacement of said member, and
   said output signal generation means measuring the phase difference between one of said reference AC signals and said output AC signal thereby generating data corresponding to the measured phase difference as said output signal.

2. A system as defined in claim 1 wherein said determination means includes means for using previously prepared data relating to said pre-determined amounts of displacement corresponding to one period of the respective detectors, wherein said output signal generation means of each of said detectors comprises a phase difference measuring circuit shared commonly by the respective detectors and a memory circuit individually provided for each of said detectors, said phase difference measuring circuit receives the output AC signal of said secondary winding means of each of said detectors on a time shared basis to perform the measurement of the phase difference between one of said reference AC signals and said each output AC signal on a time shared basis and causes data corresponding to the phase difference measured on a time shared basis to be stored in said memory circuit corresponding thereto.

3. A system as defined in claim 2 wherein said previously prepared data comprises constant data representing, respectively, differences between the output signal of said first dectector corresponding to the displacement of the object for one period of said first detector, and the output signals of the other detectors, and wherein said determination means further includes means for obtaining differences of the present output signals of the other detectors relative to the present output signals of said first detector and includes means for determining said number of periods by performing the operation with a predetermined function using said constant data with the obtained differences as the parameter.

4. A system as defined in claim 1 wherein said determination means comprises first period determination means for obtaining, as a first periodic signal whose period is a predetermined value of the number of periods relating to said first detector, a signal representing said number of periods employing the output signals of said first detector and a second one of said detectors as the parameter, the absolute position of the object being identified by combination of an integer section of said first periodic signal and the output signal of said first detector.

5. A system as defined in claim 4 wherein said determination means further comprises second period determination means for obtaining the number of periods of said first periodic signal employing the outputs of said first detector and a third one of said detectors, the absolute position of the object being identified by combination of an integer section of the number of periods obtained by said second period determination means, the integer section of said first periodic signal and the output signal of said first detector.

6. A system as defined in claim 5 wherein among the amounts of displacement of the object corresponding to one period of the respective detectors, the amount of displacement of the object corresponding to one period of said first detector is of the smallest value and the amount displacement of the object corresponding to one period of said second detector is of the largest value.

7. A system as defined in claim 1 wherein said data signal providing means provides each of said detectors with a data signal associated with the displacement of said object at a different rate with respect to each of said detectors.

8. A system as defined in claim 7 wherein said displacement providing means is a transmission device comprised of interlocking gears that are coupled so as to provide the displacement of the object to the respective detectors at different transmission ratios.

9. A system as defined in claim 1 wherein one period of said detectors previously corresponds to different amounts of mechanical displacements and said displacement providing means imparts the displacement associated with the displacement of the object at a rate which is common to all of said detectors.

10. A system as defined in claim 1, wherein the amount of displacement of the object corresponding to one period of said first detector is less than the amount of displacement corresponding to one period of any other detector.

11. A system as defined in claim 1 wherein said detector comprises a rotational position detector.

12. A system as defined in claim 11 wherein said rotational position detector comprises a detector which generates, at a plurality of periods per rotation with respect to a given rotational displacement, an output signal representing an absolute value below one period.

13. A system as defined in claim 1 wherein said detector comprises a linear position detector.

14. A system as defined in claim 11, wherein said detector comprises a phase shift type detection head generating an output obtained by phase shifting or phase modulating a reference AC signal in response to a given mechanical displacement and phase difference measurement means for measuring phase difference between the output of said detection head and the reference AC signal to provide a signal representing this phase difference as said output signal.

15. A system as defined in claim 1 wherein said plurality of detectors each generate a digital output signal expressing an absolute value below one period.

16. A system as defined in claim wherein said determination means further comprises means for judging whether the values of the output signals of said detectors or said parameters are within a predetermined error range or not and means for selectively modifying the values of the output signals or the parameters in accordance with the result of the judgement.

17. An absolute position detection device comprising:
first and second encoders each outputting an output signal representing an absolute position within one period which corresponds to a predetermined amount of displacement with respect to a given rotational or linear displacement;
wherein each of said encoders comprises a primary winding means and a secondary winding means, a member displacing relatively with respect to said primary and secondary winding means and causing a periodic reluctance change to be produced in a magentic circuit of said winding means in correspondence to said displacement, and output signal generation means,
said primary means being excited by at least two reference AC signals out of phase with each other to produce in said secondary winding means an output AC signal which is derived from each said reference AC signal by phase-shifting it in accordance with the relative displacement of said member, and
said output signal generation means measuring the phase difference between one of said reference AC signals and said output AC signal thereby generating data corresponding to the measured phase difference as said output signal;
first displacement providing means for providing said second encoder with a displacement obtained by decreasing or increasing a displacement of said first encoder at a ratio of n-a to n (a being a divisor of n and a number smaller than n); and operation means for obtaining an absolute number of periods of said first encoder from a predetermined origin to the present position with respect to the displacement given to said first encoder by obtaining a first difference between the output signals of said first and second encoders an implementing a predetermined operation employing this first difference as a parameter.

18. A device as defined in claim 17 further comprising:

a third encoder for generating an output signal representing an absolute position within one period in the same manner as said first and second encoders; and second displacement providing means for providing said encoder with a displacement obtained by decreasing or increasing a displacement of said second encoder at a rate of n+a to n;

and wherein said operation means further includes means for obtaining a second diffference, which is the difference between the output signals of said first and third encoders, and obtaining an absolute number of periods, employing said first difference and said second difference as parameters.

19. A device as defined in claim 18 wherein said operation means includes means for obtaining a first quotient defined as said first difference divided by a first constant representing an amount of change of said first difference for one period of said first encoder a second quotient in which said second difference is divided by a second constant representing an amount of change of said second difference during change of said first difference from zero to a maximum value, a first sum representing the absolute number of periods of said first encoder comprised of the integer sections of said first and second quotients, wherein an integer section of the second quotient is weighted more significantly than an integer section of the first quotient, and a second sum representing the absolute position of the displacement provided to said first encoder comprised of the combination of the absolute number of periods of said first encoder and the absolute position below one period represented by the output signal of said first encoder.

20. A device as defined in claim 19 wherein said operation means comprises:

means for obtaining said first difference;

means for obtaining said second difference;

means for judging whether the value of said first encoder belongs to a predetermined first range immediately before change of the period or a predetermined second range immediately after change of the period;

means for implementing the operation $Rx=(D_{12}-k) \div X$ (where Rx represents the number of periods, $D_{12}$ the first difference, X the constant representing the amount of change in the first difference per one period and k a constant which is a smaller number than n) when the value of the output of said first encoder has been judged to belong to said first range and the operation $Rx=(D_{12}+k) \div X$ when the value has been judged to belong to said second range; and means for judging whether the value of said first difference belongs to a predetermined third range immediately before carrying up or a predetermined fourth range immediately after carrying; and means for implementing the operation $Ry=(D_{13}-k) \div Y$ (where Ry represents the number of periods of a higher digit than Rx, $D_{13}$ the second difference, Y a constant representing the amount of change in the second difference during the change from 0 to the maximum value of the first difference) when the value of the second difference has been judged to belong to said third range and the operation $Ry=(D_{13}+k) \div Y$ when the value has benn judged to belong to said fourth range.

21. A device as defined in claim 18 wherein said operation means comprises:

means for obtaing said first difference;

means for obtaining said second difference;

means for judging whether the value of the output of said first encoder belongs to a predetermined first range immediately before change of the period or not;

means for implementing the operation $Rx=(D_{12}-k') \div X$ (where Rx represents the number of periods, $D_{12}$ the first difference, X a constant representing the amount of change in the first difference per one period and k' is 1 or an integer which is greater than 2 and where $D_{12} \div X$ is approximately 1) when the value of the output of said first encoder has been judged to belong to said first range and the operation $Rx=D_{12} \div X$ when the value has been judged not to belong to said first range;

means for judging whether the value of said second difference belongs to a predetermined second range immediately before carrying up or not; and means for implementing the operation $Ry=(D_{13}--k') \div Y$ (where Ry represents the number of periods of a higher digit than Rx, $D_{13}$ the second difference and Y a constant representing the amount of change in the second difference during the change from 0 to the maximum value) when the value of the secnd difference has been judged to belong to said second range and the operation $Ry=D_{13} \div Y$ when the value has been judged not to belong to said second range.

22. A device as defined in claim 20 wherein each of said first through third encoders detects the absolute position at an accuracy corresponding to resolution of N dimesions of one period, said first displacement providing means provides a displacement which decreases at the ratio of n−a to n, said second displacement providing means provides a displacement which increases at the ratio of n+a to n, the constant X in said operation means is a·N/n and the constant Y is also a·N/n.

23. A device as defined in claim 22 wherein there are relationships that a=1 and $n^2=N$.

24. An absolute linear position detection device comprising:

a plurality of bar members provided with a periodic pattern made of two kinds of substances of different properties, the length of one period of said pattern being slightly different between the respective adjacent pairs of said bar members;

a plurality of detectors provided in correspondence to said respective bar members each generating an electrical signal in response to the pattern of said substances;

means for moving said respective bar members in a relative linear displacement with respect to said detectors in response to linear movement of an object of detection while maintaining the positional relationship among said respective bar members and also the positional relationship between said respective detectors;

providing means for providing, responsive to the output electrical signal of said respective detectors, position signals representing positions of said bar members with respect to said respective detectors by an absolute value within one period of said pattern; and determination means for determining the number of periods from a predetermined origin to the present position of a first one of said bar members on the basis of said position signals provided by said providing means;

a present position of the object of detection being identified in an absolute value by a combination of an integer section of the number of periods determined by said determination means and a value below one period by the position signal of the first bar member.

25. An absolute linear position detection device as defined in claim 24:

wherein said periodic pattern in said bar members is made by repeatedly providing a magnetic substance and a non-magnetic substance at specified intervals;

said detectors comprise a primary winding means and a secondary winding means and said primary winding means is excited by at least two reference AC signals out of phase with each other and produces in said secondary winding means an output AC signal which is derived from each of said reference AC signals by phase shifting the signal in accordance with the relative position of the corresponding bar member; and said providing means measures the phase difference between one of the said reference AC signals and the output AC signal and provides the measured phase difference as the said position signal.

26. A system for detecting, as an absolute value, the present position of an object which is displaceable mechanically from a predetermined origin, comprising:

a plurality of detectors each generating, with a predetermined respective mutually different period, an output signal representing an absolute value within said respective period;

means for providing each of said detectors with a displacement associated with a certain displacement of said object in such a manner that one period of each of said detectors corresponds to mutually different predetermined amounts of displacement of said object;

determination means for determining the number of periods from said origin to the present position of said object with respect to a first one of said detectors, employing, for such determination, the output signals of said plurality of respective detectors each representing the value within the respective one period of that detector which corresponds to the present position of said object;

said present position of said object being identified as an absolute value by a combination of an integer corresponding to the number of period determined by said determination means and a value within one period represented by the output signal of said first detector.

27. The system defined in claim 1 wherein said output signal generation means of each of said detectors comprises a phase difference measuring circuit shared commonly by the respective detectors and a memory circuit individually provided for each of said detectors, said phase difference measuring circuit receives the output AC signal of said secondary winding means of each of said detectors on a time shared basis to perform the measurement of the phase difference between one of said reference AC signals and each said output AC signal on a time shared basis and causes data corresponding to the phase difference measured on a time shared basis to be stored in said memory circuit corresponding thereto.

28. The system as defined in claim 1 wherein said determination means further includes means for using previously prepared data relating to said predetermined amounts of displacement corresponding to one period of the respective detectors.

29. The system as defined in claim 26, wherein said determination means further includes means for correcting the indicated number of periods of rotation of said detectors based upon said displacement.

* * * * *